(12) United States Patent
Kroppe

(10) Patent No.: US 7,004,870 B2
(45) Date of Patent: Feb. 28, 2006

(54) INTEGRATED TORQUE AND ROLL CONTROL SYSTEM

(75) Inventor: William J. Kroppe, Ann Arbor, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/785,088

(22) Filed: Feb. 25, 2004

(65) Prior Publication Data

US 2005/0187059 A1    Aug. 25, 2005

(51) Int. Cl.
  F16H 48/20    (2006.01)
  B60G 17/00   (2006.01)
(52) U.S. Cl. .......................................... 475/86; 280/5.5
(58) Field of Classification Search .................. 475/84, 475/86, 223; 280/5.5, 5.508, 5.51; 701/37, 701/38, 69, 53; 180/197
  See application file for complete search history.

(56) References Cited

U.S. PATENT DOCUMENTS

| | | | | |
|---|---|---|---|---|
| 4,071,106 A | | 1/1978 | Junck et al. ................. 180/307 |
| 4,102,425 A | | 7/1978 | Marsden et al. ............. 180/242 |
| 4,271,722 A | * | 6/1981 | Campbell ...................... 475/86 |
| 4,625,584 A | * | 12/1986 | Onodera ....................... 475/86 |
| 4,741,407 A | * | 5/1988 | Torii et al. .................... 475/86 |
| 4,921,060 A | * | 5/1990 | Imaseki et al. ................ 475/86 |
| 4,966,249 A | * | 10/1990 | Imaseki ........................ 475/86 |
| 5,301,766 A | * | 4/1994 | Momiyama et al. ........... 475/86 |
| 5,630,623 A | | 5/1997 | Ganzel ........................ 280/772 |
| 6,176,496 B1 | | 1/2001 | Busch ....................... 280/6.157 |
| 6,179,310 B1 | * | 1/2001 | Clare et al. ............... 280/5.506 |
| 6,308,793 B1 | | 10/2001 | Eberling ................... 180/24.02 |
| 6,397,134 B1 | | 5/2002 | Shal et al. ...................... 701/37 |
| 6,526,342 B1 | | 2/2003 | Burdock et al. ............... 701/37 |
| 6,622,074 B1 | | 9/2003 | Coelingh et al. .............. 701/48 |
| 2002/0149161 A1 | | 10/2002 | Smith ....................... 280/5.507 |
| 2003/0200016 A1 | | 10/2003 | Spillane et al. ................ 701/36 |
| 2003/0205867 A1 | | 11/2003 | Coelingh et al. ............ 280/5.5 |

* cited by examiner

Primary Examiner—Sherry Estremsky
(74) Attorney, Agent, or Firm—Berenato, White & Stavish

(57) ABSTRACT

An integrated control system for a motor vehicle including at least one drive axle having left and right axle shafts each provided with a wheel mounted thereon. The integrated control system comprises a vehicle torque control system, a vehicle body roll control system, and a common source of a fluid pressure provided to operate both the vehicle body roll control system and the vehicle torque control system. The vehicle torque control system includes at least one fluid actuated clutch provided to regulate a drive torque distribution between the wheels of the motor vehicle in order to improve traction of the motor vehicle on a drive surface. The vehicle body roll control system includes at least one force device provided to tilt a vehicle body relative to a vehicle chassis so as to counteract a rollover-inducing force.

21 Claims, 2 Drawing Sheets

INTEGRATED TORQUE AND ROLL CONTROL SYSTEM

BACKGROUND OF THE INVENTION

1. Field of the Invention

The present invention relates to control systems for motor vehicles in general, and more particularly to an integrated fluid control system having a vehicle body roll control system and a vehicle torque control system operated by a common source of a fluid pressure.

2. Description of the Prior Art

Various torque control systems provided to regulate a drive torque distribution between drive wheels of the motor vehicle in order to improve drive traction of the motor vehicle on a road surface, are known, such as limited slip differentials employed to automatically limit slip and bias the torque distribution between a pair of rotary members. Typically, such systems are hydraulically actuated and, thus, require a source of a hydraulic pressure, such as a hydraulic pump.

Also, known are vehicle body roll control systems that include hydraulic power actuators coupled between sprung and unsprung masses of the motor vehicle and adapted to apply a force in opposition to a rolling displacement of a body of the vehicle due to lateral acceleration of the vehicle, and so counteract the vehicle body roll. Conventionally, the vehicle body roll control systems are also hydraulically actuated and require a source of a hydraulic pressure.

Normally, each of the torque control system and the body roll control system are provided with a separate, dedicated hydraulic pump, that increases complexity and overall cost of the motor vehicle. Therefore, it is the intent of this invention to overcome these shortcomings of the prior art by providing a common source of a fluid pressure to operate both the vehicle body roll control system and the vehicle torque control system.

SUMMARY OF THE INVENTION

The present invention provides a novel integrated fluid control system for a motor vehicle having at least one drive axle including left and right axle shafts each provided with a wheel mounted thereon.

The integrated fluid control system in accordance with the present invention comprises a vehicle torque control system including at least one fluidly operated clutch provided to regulate a drive torque distribution between the left and right wheels of the motor vehicle in order to improve traction and stability of the motor vehicle on a drive surface, a vehicle body roll control system including at least one fluidly operated force device provided to tilt a vehicle body relative to a vehicle chassis so as to counteract a rollover-inducing force, and a common source of a fluid pressure provided to operate both the vehicle body roll control system and the vehicle torque control system.

The integrated fluid control system in accordance with the preferred embodiment of the present invention further comprises a common electronic control unit (ECU), at least one variable control valve operating the at least one fluidly operated clutch of the vehicle torque control system, and at least one variable control valve rating the at least one fluidly operated force device of the vehicle body roll control system.

The ECU is provided to operate the common source of the fluid pressure and the variable control valves based on input signals from one or more sensors indicative to at least one vehicle parameter, such as a vehicle speed sensor, a vehicle lateral acceleration sensor, a yaw rate sensor, a steering angle sensor, etc., and/or at least one operating parameter of the integrated control system, such as fluid pressure sensor, as a control input.

Therefore, the integrated fluid control system for the motor vehicles in accordance with the present invention represents a novel arrangement of a vehicle control system providing a common source of a fluid pressure to operate both the vehicle body roll control system and the vehicle torque control system. The integrated fluid control system of the present invention offers lower cost, higher efficiency, less weight and requires less space than the existing fluid control systems.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiments of the present invention will now be described with the reference to accompanying drawings.

Figure 1:
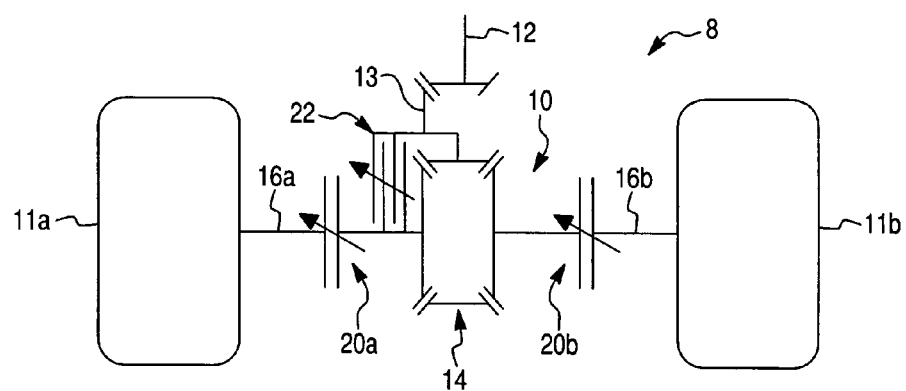
FIG. 1 is a mechanical schematic diagram showing a vehicle torque control system in accordance with the preferred embodiment of the present invention.

FIG. 1 schematically depicts a vehicle torque control system for a drive axle 8 of a motor vehicle in accordance with the preferred embodiment of the present invention. It is to be understood that the present invention is equally suitable for use in any of drive axles of an all-wheel (AWD) or four-wheel drive (4WD) motor vehicle, as well as in a single drive axle of two-wheel drive motor vehicles. It will be appreciated that the drive axle 8 may be either front axle or rear axle. Furthermore, both front and rear axles of the AWD or 4WD motor vehicle may be provided with the vehicle torque control system of the present invention.

The drive axle 8 includes a differential assembly 14 and left and right axle shafts 16a and 16b axially outwardly extending from the differential assembly 14 and drivingly coupled to left and right wheels 11a and 11b, respectively. The differential assembly 14 is rotated by a drive torque from a prime mover, such as an internal combustion engine or an electric motor (not shown), through a pinion drive shaft 12 and a ring gear 13.

As further illustrated in FIG. 1, the drive axle 8 includes a vehicle torque control system 10 provided for selectively controlling torque distribution between the left and right wheels 11a and 11b in order to improve traction of the motor vehicle on a drive surface. The vehicle torque control system 10, in turn, includes three fluidly operated selectively engageable clutch assemblies: a lock-up clutch 22, a left axle disconnect clutch 20a and a right axle disconnect clutch 20b.

The lock-up clutch 22 is a lock-up clutch adapted to prevent relative rotation between the left and right axle shafts 16a and 16b, thus locking the differential assembly 14. In accordance with the preferred embodiment of the present invention, the lock-up clutch 22 is a hydraulically actuated multi-plate clutch assembly including a friction clutch pack that selectively frictionally couples one of the left and right axle shafts 16a and 16b to the ring gear 13 or a differential case (not shown) of the differential assembly 14. Thus, the differential assembly 14 is constructed as a limited slip differential such that the differential motion of the left and right rear wheels 11a and 11b can be appropriately limited by controlling the clutching force of the lock-up clutch 22.

The left axle disconnect clutch 20a and the right axle disconnect clutch 20b are provided for selectively connecting the differential assembly 14 to the left and right wheels 11a and 11b, respectively. In accordance with the preferred embodiment of the present invention, the left and right axle disconnect clutches 20a and 20b are substantially identical hydraulically actuated friction clutches, and each of the axle disconnect friction clutches 20a and 20b includes a friction clutch pack that selectively frictionally couples the differential assembly 14 to the left and right wheels 11a and 11b, respectively.

Figure 3:
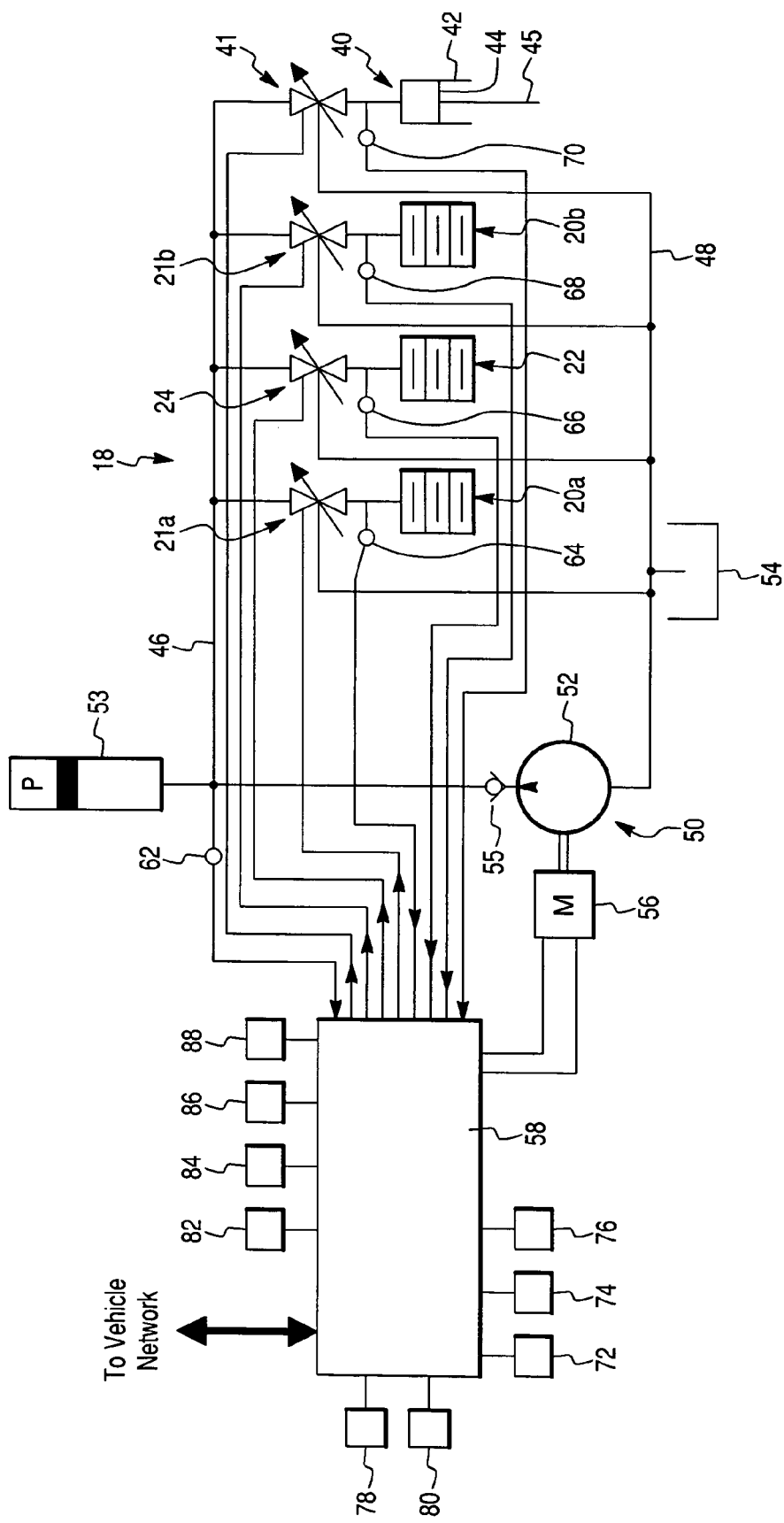
FIG. 3 is an electro-hydraulic schematic diagram of an integrated fluid control system in accordance with the preferred embodiment of the present invention.

Furthermore, as illustrated in FIG. 3, each of the clutches 20a, 20b and 22 is selectively actuated by a corresponding fluid clutch actuator (not shown) each including a piston chamber receiving a hydraulically actuated piston that serves to compress the clutch pack of the corresponding clutches 20a, 20b and 22 in response to a fluid pressure from a common source 50 of the fluid pressure, thus engaging the clutches 20a, 20b and 22. Specifically, the common source 50 of the fluid pressure provides a pressurized hydraulic or gaseous fluid to the fluid clutch actuators of the clutches 20a, 20b and 22. It will be appreciated that the amount of torque transfer (i.e., the torque ratio) is progressive and continuously variable and is proportional to the magnitude of a clutch engagement force exerted by the piston on the clutch pack which, in turn, is a function of the fluid pressure within the piston chamber.

As illustrated in FIG. 3, the torque control system 10 further comprises variable control valves 21a, 21b and 24 connected in parallel to the common fluid pressure source 50 and provided for regulating a fluid pressure supplied to the clutch actuators from the common fluid pressure source 50. More specifically, the variable left and right control valves 21a and 21b are fluidly connected to the left and right clutches 20a and 20b, respectively, and are provided for continuously regulating a fluid pressure supplied to the clutch actuators of the left and right clutches 20a and 20b from the common fluid pressure source 50. Similarly, the variable lock-up control valve 24 is fluidly connected to the lock-up clutch 22 and is provided for regulating a fluid pressure supplied to the clutch actuator of the lock-up clutch 22 from the common fluid pressure source 50. Preferably, the variable control valves 21a, 21b and 24 are electromagnetic type, proportional flow control valves. It will be appreciated that any other appropriate types of the variable control valves are within the scope of the present invention.

One of ordinary skill in the art would appreciate that by controlling the fluid pressure supplied to the clutch actuators of the clutches 20a, 20b and 22, a clutch engagement rate, thus the amount of torque transfer through the clutches 20a, 20b and 22 (or a torque transfer ratio), is continuously varied proportional to the magnitude of the fluid pressure supplied to the clutch actuators of the clutches 20a, 20b and 22. In other words, by adjusting the variable control valves 21a, 21b and 24 to provide the value of the fluid pressure supplied to the clutch actuators of the clutches 20a, 20b and 22 between the engaged and disengaged conditions, the torque transfer ratio of the torque control system 10 may be continuously varied. Thereby, the vehicle torque control system 10 of the present invention provides an infinitely variable torque transfer ratio through the drive axle to match various operating conditions of the motor vehicle.

Figure 2:
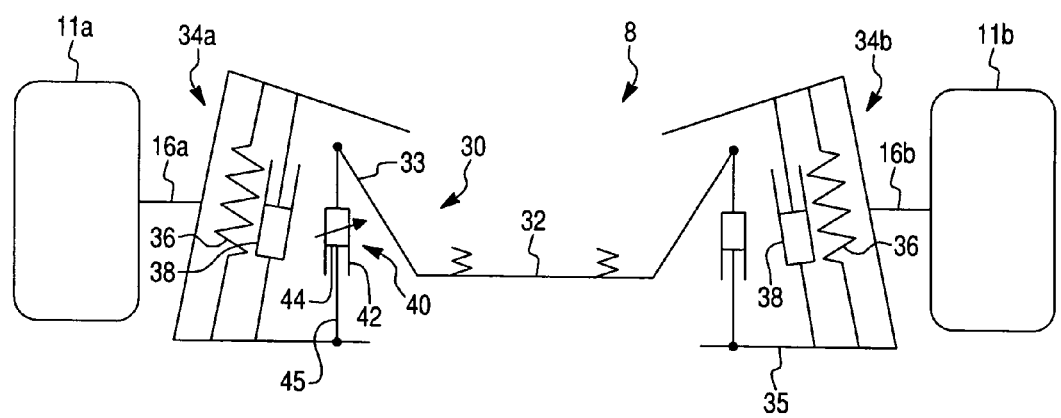
FIG. 2 is a mechanical schematic diagram showing a vehicle body roll control system in accordance with the preferred embodiment of the present invention.

FIG. 2 schematically depicts a vehicle body roll control system 30 for the axle 8 of the motor vehicle in accordance with the preferred embodiment of the present invention. In the preferred exemplary embodiment of FIG. 2, the axle 8 of the motor vehicle is a front, steering axle wherein each wheel 11a and 11b is rotatably mounted on the respective left and right axle shafts 16a and 16b and is attached to a body (not shown) of the motor vehicle by way of suspension units 34a and 34b, respectively. As an example, each of the suspension units 34a and 34b includes a coil spring 36 and a shock absorber 38.

The vehicle body roll control system 30 in accordance with the present invention is connected between the left and right wheels 11a and 11b in order to prevent an excessive body roll of the motor vehicle, especially during cornering. It is to be understood that while the present invention is described in relation to the front axle of the motor vehicle, the present invention is equally suitable for use in rear axle of the motor vehicle. Furthermore, both front and rear axles of the motor vehicle may be provided with the vehicle body roll control system of the present invention.

Referring again to FIG. 2, the vehicle body roll control system 30 comprises a torsion bar 32, and at least one force device provided to tilt a vehicle body relative to a vehicle chassis 35 so as to counteract a rollover-inducing force. In accordance with the preferred embodiments of the present invention shown in FIG. 2, the body roll control system 30 comprises a single force device in the form of a fluid pressure actuator, such as a hydraulic actuator 40. The hydraulic actuator 40 is mounted between an end 33 of the torsion bar 32 and one of the suspension units 34a, thus operatively connecting sprung and unsprung masses of the motor vehicle. It will be appreciated that alternatively the vehicle body roll control system 30 of the present invention may include two substantially identical hydraulic actuators 40, each mounted between the end of the torsion bar 32 and one of the suspension units 34a, 34b. It will be appreciated that the hydraulic actuator 40 may be either single acting or double acting.

As further illustrated in FIGS. 2 and 3, the hydraulic actuator 40 comprises a pressure cylinder 42 containing the hydraulic fluid, a piston 44 reciprocating within the pressure cylinder 42, and a piston rod 46 connected to the piston 44 and extending through the pressure cylinder 42.

As illustrated in FIG. 3, the vehicle body roll control system 30 further includes an electrically controlled variable roll control valve 41 connected in parallel to the common fluid pressure source 50. More specifically, the variable control valve 41 is fluidly connected to the pressure cylinder 42, and is provided for regulating a fluid pressure supplied to the pressure cylinder 42 from the common fluid pressure source 50. Preferably, the variable control valve 41 is an electromagnetic type, proportional flow control valve. It will be appreciated that any other appropriate types of the variable control valves are within the scope of the present invention.

As evident from the above description, both the vehicle torque control system 10 and the vehicle body roll control system 8 of the present invention have an integrated control system 18 (shown in FIG. 3) that includes the common source 50 of the fluid pressure, and a common electronic control unit (ECU) 58 operating the common source 50 of the fluid pressure, the variable control valves 21a, 21b and 24 of the clutches 20a, 20b and 22, respectively, of the vehicle torque control system 10, and the variable control valve 41 of the vehicle body roll control system 30.

In accordance with the preferred embodiment of the present invention illustrated in FIG. 3, the common source 50 of the fluid pressure comprises a fluid pump 52 driven by an electric motor 56, a fluid pressure accumulator 53 in fluid communication with the fluid pump 52, and a fluid reservoir 54 storing a supply of an appropriate fluid. More preferably, the fluid employed is a hydraulic fluid, such as hydraulic oil, the pump 52 is a positive displacement hydraulic pump, such as a gear pump, and the fluid pressure accumulator 53 is a hydraulic high-pressure accumulator provided for storing an appropriate amount of a hydraulic fluid under pressure, so that the common source 50 of the fluid pressure provides the all three clutches 20a, 20b and 22 of the vehicle torque control system 10 and the hydraulic actuator 40 of the vehicle body roll control system 30 with the pressurized hydraulic fluid.

As illustrated in FIG. 3, the hydraulic pump 52 receives the hydraulic fluid from the hydraulic fluid reservoir 54 and supplies the fluid to the pressure accumulator 53 via a main hydraulic passage 46 including a check valve 55 allowing the fluid flow only in the direction from the hydraulic pump 52. The hydraulic pressure generated by the common hydraulic pressure source 50 is supplied to the clutches 20a, 20b, 22 and the hydraulic actuator 40 through a supply passageway 47 and the corresponding variable control valves 21a, 21b, 24 and 41, respectively. The excess flow of the hydraulic fluid from the clutches 20a, 20b, 22 and the hydraulic actuator 40 is returned to the fluid reservoir 54 through a return flow passage 48.

The ECU 58 transmits control signals to the variable control valves 21a, 21b, 24 and 41 based on input signals from one or more sensors indicative to at least one vehicle parameter and/or at least one operating parameter of the integrated control system 18 as a control input. In accordance with the preferred embodiment of the present invention, the ECU 58 receives signals from sensors 72, 74 and 76 indicative to a speed difference between inputs and outputs of the clutches 20a, 20b and 22, a sensor 78 indicative to a position of the piston 44 within the cylinder 42, a sensor 80 indicative to a speed of the piston 44 within the cylinder 42, a vehicle speed sensor 82, a vehicle lateral acceleration sensor 84, a yaw rate sensor 86, and a steering angle sensor 88. It will be appreciated that any other appropriate sensors indicative to various vehicle parameters may be employed. The ECU 58 also receives signals from a pressure sensor 62 providing a signal indicative to a fluid pressure in the supply passageway 47, a pressure sensor 64 providing a signal indicative to a fluid pressure supplied to the left clutch 20a through the control valve 21a, a pressure sensor 66 providing a signal indicative to a fluid pressure supplied to the lock-up clutch 22 through the control valve 24, a pressure sensor 68 providing a signal indicative to a fluid pressure supplied to the right clutch 20b through the control valve 21b, and a pressure sensor 70 providing a signal indicative to a fluid pressure supplied to the hydraulic actuator 40 through the control valve 41. As shown in FIG. 3, the ECU 58 may be connected to a vehicle electronic network, such as a controlled area network (CAN).

When energized, the variable control valves 21a, 21b and 24 are capable of modulating a supply pressure of the common fluid pressure source 50 in a variable range from a minimum pressure to a maximum pressure, thereby selectively and variably controlling a drive torque transmitted through the clutches 20a, 20b and 22 and applied the output axle shafts 16a and 16b in a range from a minimum torque value to a maximum torque value in response to the control signal from the ECU 58. In other words, the variable control valves 21a, 21b and 24 are capable of providing a partial actuation of the clutches 20a, 20b and 22 between a fully engaged and fully disengaged conditions. Similarly, the variable control valve 41 is capable of modulating a supply pressure of the common fluid pressure source 50 in a variable range from a minimum pressure to a maximum pressure, thereby selectively and variably controlling the hydraulic actuator 40, thus the body roll of the motor vehicle in response to the control signal from the ECU 58.

Therefore, the integrated control system 18 of the present invention selectively and variably operates both the vehicle torque control system 10 and the vehicle body roll control system 30.

In operation, when the ECU 58 determines that no torque control or roll control is required (typically during straight line motion of the vehicle), the valves 21a, 21b, 24 and 41 are set to the minimum pressure so that the clutches 20a, 20b and 22 are in the disengaged condition and the hydraulic actuator 40 provides no resistance to the movement of the piston 44 within the cylinder 42.

However, when the ECU 58 determines that vehicle torque control is required, one or more of the control valves 21a, 21b and 24 are moved to a position that provides certain hydraulic pressure to the clutch actuators engage corresponding clutches 20a, 20b and 22 to selectively and variably control the drive torque transmitted therethrough as determined by the ECU 58 in response to the signals from the sensors 72–76 and 82–88. Similarly, when the ECU 58 determines that roll control is required, the control valve 41 is moved to a position that provides certain resistance to the movement of the piston 44 within the cylinder 42 as determined by the ECU 58 in response to the signals from the sensors 78–88.

Therefore, the integrated fluid control system for motor vehicles in accordance with the present invention represents a novel arrangement provided to operate both the vehicle torque control system and the vehicle body roll control system. It will be appreciated that any other vehicle control system requiring a source of a fluid pressure, such as hydro-pneumatic or pneumatic suspension systems, stability control systems, inter-axle coupling devices, inter-axle differential assemblies, etc., may be operated by the integrated control system of the present invention.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A fluid control system for a motor vehicle having at least one drive axle having left and right axle shafts each provided with a wheel mounted thereon, said fluid control system comprising:
   a vehicle torque control system including at least one fluidly operated clutch provided to regulate a drive torque distribution between said wheels of said motor vehicle in order to improve traction and stability of said motor vehicle on a drive surface;
   a vehicle body roll control system including at least one fluidly operated force device operatively connecting sprung and unsprung masses of the motor vehicle and provided to tilt a vehicle body relative to a vehicle chassis so as to counteract a rollover-inducing force; and
   a common source of a fluid pressure provided to operate both said vehicle body roll control system and said vehicle torque control system;
   said torque control system further including a left axle disconnect clutch provided to selectively disconnect a torque transfer from a prime mover of the motor vehicle to the left wheel thereof, a right axle disconnect clutch provided to selectively disconnect a torque transfer from the prime mover of the motor vehicle to the right wheel thereof, and left and right clutch actuators each provided for selectively operating corresponding one of said left and right clutches between a disengaged condition and an engaged condition in response to the fluid pressure from said common source of the fluid pressure.

2. The fluid control system as defined in claim 1, wherein said torque control system includes at least one variable control valve in fluid communication with said common source of the fluid pressure for selectively regulating a fluid pressure supplied to said at least one clutch from said common source of the fluid pressure for continuously varying a torque transfer ratio through said at least one clutch between the engaged and disengaged conditions, and wherein said vehicle body roll control system includes at least one variable control valve in fluid communication with said common source of the fluid pressure for selectively regulating a fluid pressure supplied to said at least one force device from said common source of the fluid pressure.

3. The fluid control system as defined in claim 2, wherein said at least one variable control valve of said torque control system and said at least one variable control valve of said vehicle body roll control system are selectively and variably controlled by an electronic controller in response to at least one vehicle parameter.

4. The fluid control system as defined in claim 3, wherein said torque control system includes:
   a differential assembly coupled to each of said left and right axle shafts outwardly extending from said differential assembly;
   a fluidly operated selectively engageable lock-up clutch for limiting relative rotation between said left and right axle shafts; and
   a lock-up clutch actuator for selectively operating said lock-up clutch between a disengaged condition and an engaged condition in response to the fluid pressure from said common source of the fluid pressure.

5. The fluid control system as defined in claim 4, wherein said torque control system further includes a variable lock-up control valve in fluid communication with said common source of the fluid pressure for selectively regulating a fluid pressure supplied to said lock-up clutch actuator from said common source of the fluid pressure for continuously varying a torque transfer ratio through said lock-up clutch between the engaged and disengaged conditions.

6. The fluid control system as defined in claim 5, wherein said lock-up clutch is a friction clutch.

7. The fluid control system as defined in claim 3, wherein said vehicle body roll control system further includes a variable roll control valve in fluid communication with said common source of the fluid pressure for selectively regulating a fluid pressure supplied to said at least one fluidly operated force device from said common source of the fluid pressure.

8. The fluid control system as defined in claim 7, wherein said at least one fluidly operated force device of said vehicle body roll control system is a fluid pressure actuator.

9. The fluid control system as defined in claim 8, wherein said fluid pressure actuator includes a pressure cylinder in fluid communication with said variable roll control valve, a piston reciprocating within said pressure cylinder, and a piston rod connected to said piston and extending through said pressure cylinder; a distal end of said pressure cylinder is secured to one of the sprung mass and the unsprung mass of the motor vehicle and a distal end of said piston rod is secured to the other one of the sprung mass and the unsprung mass of the motor vehicle.

10. The fluid control system as defined in claim 3, wherein said electronic controller is connected to a plurality of sensors each indicative to at least one vehicle parameter or at least one operating parameter of said fluid control system as a control input.

11. The fluid control system as defined in claim 10, wherein said at least one vehicle parameter is one of a speed difference between input and output of one of said clutches, a vehicle speed, a vehicle lateral acceleration, a yaw rate and a steering angle.

12. The fluid control system as defined in claim 10, wherein said at least one operating parameter of said fluid control system is one of a fluid pressure supplied to said torque and body roll control systems by said common source of the fluid pressure, a fluid pressure supplied to said at least one clutch of said vehicle torque control system and a fluid pressure supplied to said at least one fluidly operated force device of said vehicle body roll control system.

13. The fluid control system as defined in claim 1, wherein said torque control system further includes variable left and right control valves each in fluid communication with said common source of the fluid pressure for selectively regulating a fluid pressure supplied to each of said left and right clutch actuators from said common source of the fluid pressure.

14. The fluid control system as defined in claim 13, wherein said left and right clutches are friction clutches.

15. The fluid control system as defined in claim 1, wherein said torque control system and said vehicle body roll control system are selectively and variably controlled by an electronic controller in response to at least one vehicle parameter or at least one operating parameter of said fluid control system.

16. The fluid control system as defined in claim 1, wherein said common source of the fluid pressure for said vehicle torque control system and said vehicle body roll control system is selectively and variably controlled by an electronic controller in response to at least one vehicle parameter or at least one operating parameter of said fluid control system.

17. The fluid control system as defined in claim 1, wherein said common source of the fluid pressure includes a fluid pump.

18. The fluid control system as defined in claim 17, wherein said common source of the fluid pressure further includes a fluid pressure accumulator in fluid communication with said fluid pump.

19. The fluid control system as defined in claim 18, wherein said common source of the fluid pressure further includes a fluid reservoir storing a supply of an appropriate fluid.

20. A fluid control system for a motor vehicle having at least one drive axle having left and right axle shafts each provided with a wheel mounted thereon, said fluid control system comprising:
- a vehicle torque control system including at least one fluidly operated clutch provided to regulate a drive torque distribution between said wheels of said motor vehicle in order to improve traction and stability of said motor vehicle on a drive surface;
- a vehicle body roll control system including at least one fluidly operated force device operatively connecting sprung and unsprung masses of the motor, vehicle and provided to tilt a vehicle body relative to a vehicle chassis so as to counteract a rollover-inducing force; and
- a common source of a fluid pressure provided to operate both said vehicle body roll control system and said vehicle torque control system;
- said common source of the fluid pressure for said vehicle torque control system and said vehicle body roll control system being selectively and variably controlled by an electronic controller in response to at least one vehicle parameter or at least one operating parameter of said fluid control system.

21. A fluid control system for a motor vehicle having at least one drive axle having left and right axle shafts each provided with a wheel mounted thereon, said fluid control system comprising:
- a vehicle torque control system including at least one fluidly operated clutch provided to regulate a drive torque distribution between said wheels of said motor vehicle in order to improve traction and stability of said motor vehicle on a drive surface;
- a vehicle body roll control system including at least one fluidly operated force device operatively connecting sprung and unsprung masses of the motor vehicle and provided to tilt a vehicle body relative to a vehicle chassis so as to counteract a rollover-inducing force; and
- a common source of a fluid pressure provided to operate both said vehicle body roll control system and said vehicle torque control system;
- said torque control system further including at least one variable control valve in fluid communication with said common source of the fluid pressure for selectively regulating a fluid pressure supplied to said at least one clutch from said common source of the fluid pressure for continuously varying a torque transfer ratio through said at least one clutch between the engaged and disengaged conditions;
- said vehicle body roll control system further including at least one variable control valve in fluid communication with said common source of the fluid pressure for selectively regulating a fluid pressure supplied to said at least one force device from said common source of the fluid pressure;
- said at least one variable control valve of said torque control system and said at least one variable control valve of said vehicle body roll control system being selectively and variably controlled by an electronic controller in response to at least one vehicle parameter;
- said electronic controller connected to a plurality of sensors each indicative to at least one vehicle parameter or at least one operating parameter of said fluid control system as a control input;
- said at least one operating parameter of said fluid control system being one of a fluid pressure supplied to said torque and body roll control systems by said common source of the fluid pressure, a fluid pressure supplied to said at least one clutch of said vehicle torque control system and a fluid pressure supplied to said at least one fluidly operated force device of said vehicle body roll control system.

* * * * *